(12) United States Patent
Bruegl et al.

(10) Patent No.: US 7,057,811 B2
(45) Date of Patent: Jun. 6, 2006

(54) PROJECTION SYSTEM AND METHOD COMPRISING A FLUORESCENCE PROJECTION SCREEN AND A RADIATION SOURCE WHICH CAN EMIT IN THE NON-VISIBLE SPECTRUM

(75) Inventors: Juergen Bruegl, Munich (DE); Michael Heimrath, Fuerstenfeldbruck (DE); Sonja Hauser, Friedberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/014,853

(22) Filed: Dec. 20, 2004

(65) Prior Publication Data

US 2005/0174635 A1 Aug. 11, 2005

Related U.S. Application Data

(63) Continuation of application No. PCT/EP03/04485, filed on Apr. 30, 2003.

(30) Foreign Application Priority Data

Jun. 20, 2002 (DE) .................................. 102 27 468

(51) Int. Cl.
| | |
|---|---|
| G03B 21/56 | (2006.01) |
| G03B 21/00 | (2006.01) |
| G02F 1/13 | (2006.01) |
| G02F 1/1335 | (2006.01) |
| G03C 11/00 | (2006.01) |
| C09K 19/00 | (2006.01) |
| G09G 3/06 | (2006.01) |

(52) U.S. Cl. ........................... 359/443; 353/13; 349/2; 349/71; 349/27; 430/21; 430/508; 428/1.23; 428/1.32; 345/47

(58) Field of Classification Search ................ 359/443, 359/362; 349/2, 71, 27; 430/21, 502, 508; 428/1.1, 1.23, 1.32; 353/13; 345/47; 362/503
See application file for complete search history.

(56) References Cited

U.S. PATENT DOCUMENTS

| 5,056,890 A | * | 10/1991 | Iino et al. ................... 359/630 |
| 5,764,403 A | * | 6/1998 | Downing .................... 359/326 |
| 5,867,133 A | * | 2/1999 | Toffolo et al. ................. 345/7 |
| 6,522,311 B1 | * | 2/2003 | Kadowaki et al. ............. 345/7 |
| 6,733,133 B1 | * | 5/2004 | Egle et al. .................... 353/13 |
| 2002/0063946 A1 | | 5/2002 | Bass et al. |

FOREIGN PATENT DOCUMENTS

| EP | 0 455 449 A2 | 11/1991 |
| JP | 11-0 38 506 A | 2/1999 |
| JP | 11-041548 | 2/1999 |

\* cited by examiner

*Primary Examiner*—W. B. Perkey
*Assistant Examiner*—Magda Cruz
(74) *Attorney, Agent, or Firm*—Crowell & Moring LLP

(57) ABSTRACT

A projection system and method are provided, the system includes a radiation source for generating electromagnetic radiation outside the visible wavelength range, an imaging unit, which can be irradiated by the radiation source, and a projection screen having a radiation-sensitive surface which, when excited by means of the above-mentioned invisible radiation, can emit fluorescent light in the visible wavelength range. The radiation-sensitive surface is formed of a material which, irrespective of the position, emits fluorescent light of different wavelengths as a function of the wavelength of the excitation radiation, and the radiation source can emit excitation radiation of different wavelengths.

19 Claims, 2 Drawing Sheets

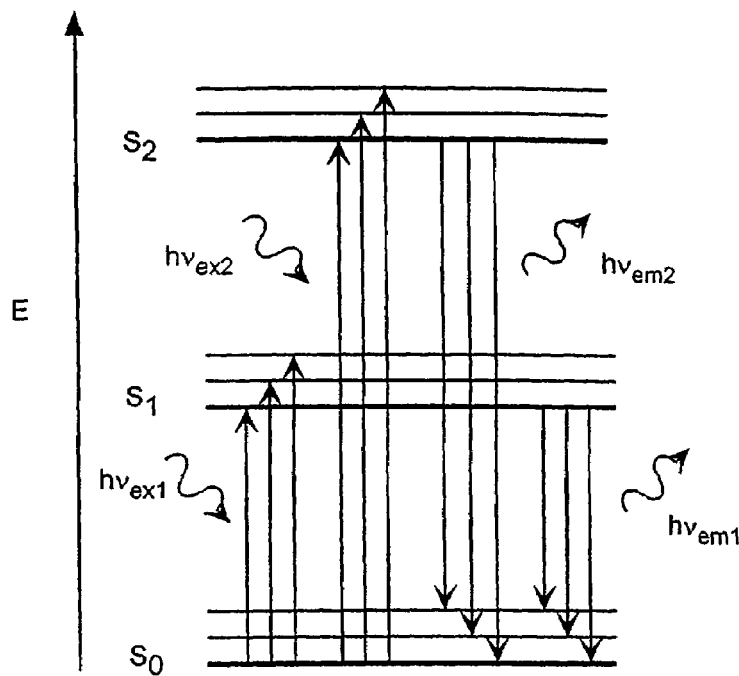
Fig. 1
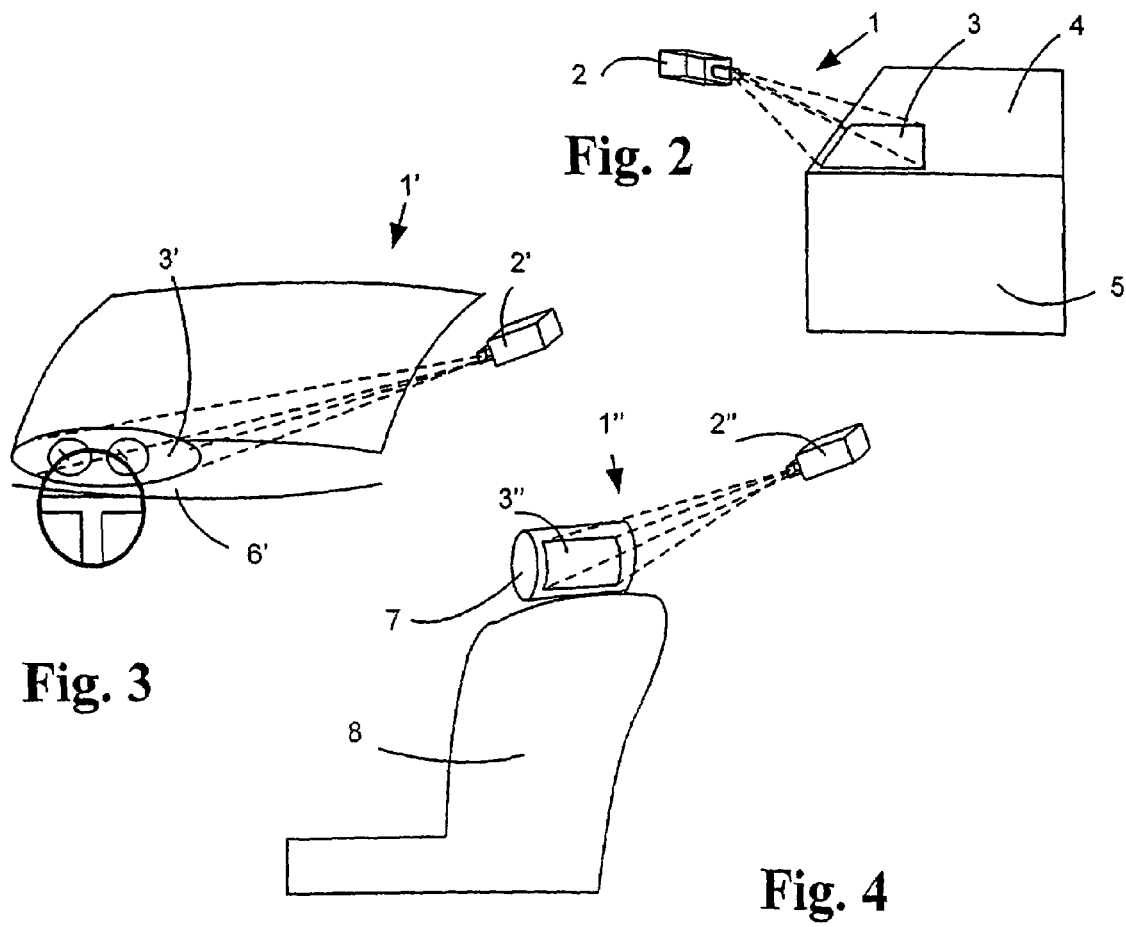
Fig. 2
Fig. 3
Fig. 4

PROJECTION SYSTEM AND METHOD COMPRISING A FLUORESCENCE PROJECTION SCREEN AND A RADIATION SOURCE WHICH CAN EMIT IN THE NON-VISIBLE SPECTRUM

CROSS-REFERENCE TO RELATED APPLICATIONS

This application is a continuation of PCT Application No. PCT/EP2003/004485 filed on Apr. 30, 2003, which claims priority to German Application No. 102 27 468.1 filed Jun. 20, 2002.

BACKGROUND AND SUMMARY OF THE INVENTION

The invention relates to a projection system, including a radiation source for generating electromagnetic radiation outside the visible wavelength region, an imaging unit which can be irradiated by the radiation source, and a projection screen having a radiation-sensitive surface which, when excited by means of the above-mentioned invisible radiation, can emit fluorescent light in the visible wavelength range.

The invention further relates to a method for the imaging display of information on a projection screen, which screen is irradiated by a radiation source of electromagnetic radiation outside the visible wavelength range by way of an imaging unit and has a radiation-sensitive surface which, when excited by the above-mentioned invisible radiation, can emit fluorescent light in the visible wavelength range.

From Japanese Patent document JP 110 41 548 A, a projection system and a method of the above-mentioned type are known, in which case ultraviolet (UV) radiation is emitted by a radiation source. By means of a two-dimensional mirror filed with a plurality of micromirrors on a silicon substrate, which micromirrors can be controlled in their angular orientation and are irradiated by the UV source, a two-dimensional image signal is modulated onto the UV radiation, which image signal is reflected onto a fluorescent projection screen, each micromirror corresponding to a pixel. In a radiation-sensitive layer of the fluorescent projection screen, in the area of each pixel, three spatially mutually different subpixels are arranged which are each constructed of different materials. Due to the irradiation with UV rays of the same wavelength range, these different materials are excited to emit visible fluorescent light in material-specifically different wavelength ranges.

A disadvantage of this known projection system and method is, on the one hand, the high-expenditure production of the projection screen, in which case different materials have to be arranged with a high spatial precision. This results in high rejection rates and, thus, in high manufacturing costs, particularly in the case of larger-surface displays. In addition, the maximally achievable resolution is considerably reduced. On the other hand, such a system and method are extremely sensitive with respect to the relative mutual alignment of the individual components. Even small deflections from the ideal position result in a general color displacement of the display because, instead of the correct subpixel, an adjacent subpixel is irradiated which, however, emits light of a different color. The known systems and the known method are therefore only suitable for small displays with mutually rigidly connected components arranged with as little vibration as possible.

Further, from U.S. Pat. No. 5,684,621 A, a projection system is known for displaying three-dimensional images. In this case, a rectangular parallelepiped consisting of a rare-earths-doped crystalline or glass-type basic material, which is transparent in the visible and the infrared (IR) wavelength range, is used as the projection volume. The projection volume is scanned by two lasers, which emit IR radiation and are controlled such that their beams intersect at certain points. In these points, the energy density of the radiation is so high that, to a considerable extent, a so-called two-photon excitation occurs, that is, the simultaneous absorption of two IR photons by a rare-earths ion. The ion relaxes into its normal state while emitting fluorescent photons in the visible wavelength range, whereby the respective point of intersection of the laser beams appears as a light spot. A controlling of the color of the light point can be implemented by changing the wavelength of at least one of the two lasers. The reason is that the rare-earths ions firmly inserted into the crystal or glass structure of the basic material have different, relatively sharp, energy levels which can be excited by different excitation energies and relax into the normal state while emitting energetically different, that is, differently colored photons.

However, in the case of this known projection system, the large space requirement of the projection volume as well as the complicated control of the lasers, which is extremely sensitive with respect to the relative alignment of its components, are disadvantageous.

The same disadvantages apply to U.S. Pat. No. 5,764,403 A originating from U.S. Pat. No. 5,684,621, which essentially has the same functional construction. Although the projection volume or the video screen is flatter here, it is also constructed three-dimensionally as a radiation-sensitive rectangular parallelepiped, into which radiation takes place in a plane and which is viewed perpendicular thereto. The height of the rectangular parallelepiped therefore plays a significant role and cannot be reduced arbitrarily.

It is therefore an object of the present invention to provide a projection system which is advantageous with respect to its manufacturing and robust with respect to its application and is, therefore, particularly suitable for use in a motor vehicle.

According to the invention, this object is achieved in that the radiation-sensitive surface of the projection screen comprises a material which, independently of the location, emits fluorescent light of different wavelengths as a function of the wavelength of the excitation radiation, and in that the radiation source can emit excitation radiation of different wavelengths.

As a result of the further development of the projection screen according to the invention, for example, by the use of one of the materials disclosed in U.S. Pat. No. 5,684,621 as the radiation-sensitive surface, the problem of controlling different colors during the display can be shifted from the spatial alignment of all components to the controlling of different excitation wavelengths, which is significantly easier to implement. This permits, on the one hand, a significantly greater flexibility with respect to the usage possibilities and, on the other hand, also a much more robust further development than in the prior art. In particular, vibrations of the system only lead to a corresponding spatial displacement of the projection image but not to a color displacement, so that a use, for example, in motor vehicles becomes possible.

The materials disclosed in U.S. Pat. No. 5,684,621 as being suitable for producing projection volumes can easily be integrated into projection screens of many different shapes, in which case either essentially flat carriers themselves can be doped with suitable ions or can be coated with doped material, for example, by the application of lacquer or vaporizing.

According to a preferred embodiment, the radiation source comprises a laser with a controllable output wavelength. The controlling of the system therefore becomes particularly uncomplicated because the advantageous intensity characteristics and focusing characteristics of the laser can be utilized and simultaneously only the control of one beam has to be carried out.

However, it is also contemplated according to another embodiment that the radiation source includes several lasers of different output wavelengths. Although, as a result, the control is a little more complicated, the image construction can take place more rapidly, which permits larger projections with higher resolutions and/or less flickering.

A preferred embodiment is characterized in that the radiation source can emit electromagnetic radiation in the ultraviolet wavelength range. This is based on the recognition that fluorescent materials, as a rule have a negative Stokes displacement; thus requiring a higher-energy excitation, that is, shorter-wave excitation for the emission of visible light. This also applies to the materials disclosed in U.S. Pat. No. 5,684,621 as suitable for the production of projection volumes. However, because of the spatial representation desired there, no UV excitation radiation could be used there because the latter would generate fluorescence along the entire absorption path of the UV ray and not only in the desired image spot. However, in the present case of an essentially flat projection screen, higher-energy excitation radiation can also be used directly.

In another embodiment, it is also contemplated that the radiation source can emit electromagnetic radiation in the infrared wavelength range. However, here the intensity of the ray should be so high that two-photon absorption takes place to a sufficient extent in the radiation-sensitive layer of the projection screen. This can take place, for example, by using several rays intersecting in the radiation-sensitive layer or by using a single, sufficiently intensive beam.

In a particularly advantageous embodiment, several projection screens are provided, which are irradiated by a radiation source by way of an imaging unit. This has the advantage that several viewers at different locations have an optimal view of the illustrated information, or that different information can be clearly presented to a viewer at different locations, in each case only one opto-electronic unit being required. As a result, the most expensive and costly part of the system has to be provided only once.

The projection system or the projection screen is preferably arranged in, or on, a motor vehicle. This results in flexible possibilities for providing information and/or entertainment in the motor vehicle, which meets the requirements of the continuously increasing number of monitoring and control parameters in modern motor vehicles, particularly cars, and the associated problems of the logical and clear presentation of information.

An embodiment is particularly preferred in which the at least one projection screen is arranged in the area of the dashboard of a motor vehicle. As a result, the customary arrangement of displays in the motor vehicle can be maintained, but a fixed installation of specific indicating instruments, such as the speedometer, the tachometer, etc. is avoided. On the contrary, it becomes possible to create user-specific and/or situation-specific displays by a suitable programming of the imaging unit.

In another advantageous embodiment, it is provided that at least one projection screen is arranged in the area of a side window or of the windshield of a motor vehicle. This has the advantage that the driver can read the displays without having to completely look away from the traffic situation.

Furthermore, it can be provided that at least one projection screen is arranged in the area of the rearward side of the driver seat and/or of the front passenger seat of a motor vehicle. This permits the presenting of entertainment in the form of video, TV or computer games to vehicle occupants in the rear seats during the drive. Naturally, the control of the imaging unit has to be designed in an appropriate manner for this purpose.

The imaging unit can be constructed in various fashions known to the person skilled in the art. Microelectromechanical systems (MEMs) are suitable for this purpose. These include DMD microdisplays (DMD=digital micromirror device), biaxially deflectable micromirrors and GLVs (grating light valves). Also suitable are constructions such as LCOS microdisplays (liquid crystal on silicon), a scanning system comprising two galvanometer mirrors, a combination of galvanometer mirrors and an MRS (mechanical resonant scanner) or two mechanical resonant scanners.

Such elements, as well as the pertaining controls in hardware and software, are commercially available and can therefore be integrated in a cost-effective manner. They can be operated together with laser light sources or other light sources. The imaging unit can be controlled by a programmable computer.

In an advantageous embodiment, it can be provided to arrange the radiation source and the imaging unit, relative to the viewer, behind the projection screen. As a result, it is avoided, particularly in narrow drivers' cabs of a motor vehicle, that the viewer blocks or shades the projection screen from the imaging unit. Rather, a covered installation into the vehicle becomes possible.

On the other hand, it is also contemplated that, from the direction of the viewer, the radiation source and the imaging unit are arranged in front of the projection screen. This also permits the projection onto screens which have no constructions behind them, for example, windows of a motor vehicle.

It is particularly advantageous for the projection screen to be provided with a coating, which coating is impenetrable or absorbing for the excitation radiation used. This coating should naturally be applied to the side of the screen facing away from the imaging unit. It can thereby be prevented that the viewer is exposed to the excitation radiation—in the transmission or in the reflection—, which is an important safety aspect, particularly, in the case of an intensive laser radiation.

It is another object of the invention to provide a method which permits a cost-effective and robust display of information and is suitable particularly for the use in a motor vehicle.

According to the invention, the last-mentioned object is achieved in that, as a result of the variation of the wavelength of the invisible electromagnetic radiation, fluorescent light of different colors is emitted by the radiation-sensitive surface of the projection screen, which consists of a material which, irrespective of the location, gives off fluorescent light of different wavelengths as a function of the wavelength of the excitation radiation.

As a result of the fact that the fluorescent light of different colors or wavelengths is emitted as a function of the wavelength of the excitation radiation irrespective of the location and, as a result of the variation of the wavelength of the invisible electromagnetic radiation, a cost-effective and robust display of information becomes possible. Vibrations in the system—as mentioned above—do not result in a color displacement, so that the method can also be used in motor vehicles.

Other objects, advantages and novel features of the present invention will become apparent from the following detailed description of the invention when considered in conjunction with the accompanying drawings.

BRIEF DESCRIPTION OF THE DRAWINGS

FIG. 1 is a schematic representation showing the energy level of a fluorophore;

FIG. 2 is a schematic representation of a first embodiment of a projection system according to the invention;

FIG. 3 is a schematic representation of a second embodiment of the projection system according to the invention;

FIG. 4 is a schematic representation of a third embodiment of the projection system according to the invention.

DETAILED DESCRIPTION OF THE DRAWINGS

Figure 5:
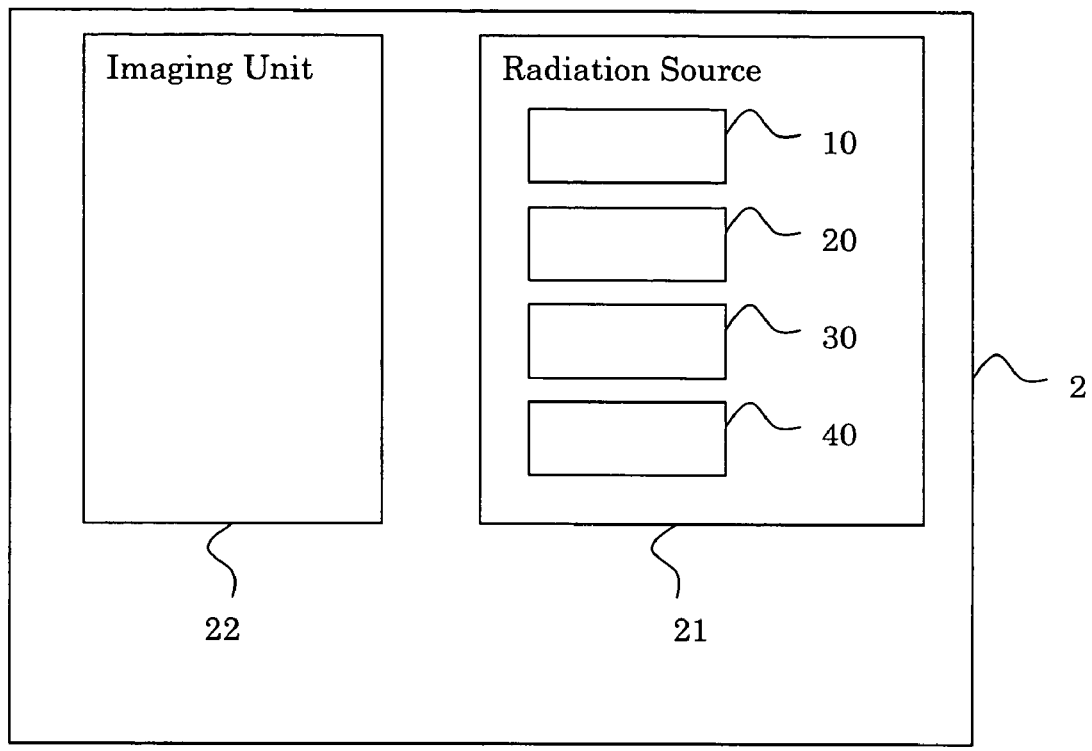
FIG. 5 illustrates an exemplary projection unit including a plurality of lasers, in accordance with the present invention.

FIG. 1 is a schematic representation of the energy level of a fluorophore; that is, of a fluorescent molecule, ion, atom, or the like, for example, of a rare-earths ion in a glass-type or crystalline carrier material. Normally, the ion is in its normal state $S_0$, which is illustrated as a thick line in FIG. 1. As a rule, the phononic sublevels illustrated as thinner lines are not excited. By the beaming-in of an energy hv, for example, in the form of electromagnetic radiation, the ion can be lifted into a higher energy state. However, this occurs only when the beamed-in energy corresponds to the energy gap between the normal state $S_0$ and a higher state $S_1$ or $S_2$. These excitation energies have the symbols $hv_{ex1}$ and $h_{ex2}$ in FIG. 1, which correspond to radiation of the wavelengths $\lambda_{ex1}=c/v_{ex1}$ and $\lambda_{ex2}=c/v_{ex2}$, wherein c is the speed of light; v is the frequency and h is Planck's constant. The energy gap can also be bridged by multiple-photon absorption; that is, the simultaneous absorption of several low-energy photons. However, this is a physically different phenomenon which occurs with a much lower probability.

Since, as a result of the beaming-in, higher phononic levels, indicated by the thinner lines above the excited conditions, can also be excited, the absorption bands are not completely sharp but have a more or less broad spectrum. After the lifetime of the excited condition, which is normally in the ns-range, the ion returns from its excited state into the normal state, in which case a photon of the energy $hv_{em1}$ or $hV_{em2}$ is emitted. As a rule, this radiation has longer wavelengths than the excitation radiation because, before the emission of the fluorescence photon, the excited ion, as a result of internal conversion, changes into the lowest phononic level of the excited condition but, on the other hand, can return to a higher phononic level of the normal condition. This is a negative Stokes displacement. It therefore becomes possible, when a suitable material is selected, to generate fluorescent light in the visible spectral range by excitation in the UV range. As clearly indicated in FIG. 1, the wavelength, that is, the color of the fluorescent light, essentially depends from which excited condition from which the ion returns into its normal state. However, as explained above, this is mainly dependent on the wavelength of the excitation radiation. Thus, it becomes possible to generate different colors of fluorescent light by appropriately controlling the excitation wavelengths.

FIG. 2 illustrates a projection system 1 according to the invention, consisting of a projection unit 2 and a projection screen 3. The projection unit 2 comprises a radiation source and an imaging unit, which are both not illustrated in detail in the drawing. The radiation source may, for example, be a UV-laser with a controllable wavelength or an array of, for example, three UV-lasers of fixed but different wavelengths, which are each suitable for exciting red, green or blue fluorescence. In addition to microelectromechanical systems (MEMs), mainly computer-controlled, two galvanometric mirrors comprising scanning systems, biaxially deflectable micromirrors, LCOS microdisplays or DMD microdisplays can be used as imaging units.

In the embodiment of FIG. 2, the projection screen 3 is implemented in the area of a side window 4 of a motor vehicle 5 door. This can, for example, take place in that the glass of the side window 4 in the area of the projection screen 3 is doped with suitable ions or carries a corresponding coating, such as, a lacquer coating or a vaporization coating.

FIG. 3 illustrates another embodiment of the projection system 1' according to the invention. The projection screen 3', which is irradiated by the projection unit 2', is arranged here in the area of the dashboard 6 of a motor vehicle.

Finally, FIG. 4 shows a third embodiment of the projection system 1" according to the invention. The projection screen 3", which is irradiated by the projection unit 2", is arranged here in the rearward area of the headrest 7 of a driver seat or front passenger seat 8 of a motor vehicle. Projection screens 3'and 3" may be additional projection screens in a projection system including projection screen 3.

FIG. 5 illustrates an exemplary projection unit including a plurality of lasers, in accordance with the present invention. The projection unit 2 includes a radiation source 21 and an imaging unit 22. The radiation source 21 may include a plurality of lasers 10, 20, 30, and 40, each of which has a different output wavelength. Although four lasers are illustrated in FIG. 5, the radiation source 21 is not limited to this number of lasers.

Naturally, the present invention is not limited to the illustrated embodiments. Many additional advantageous variants are conceivable. Thus, particularly, additional surfaces in the area of the inside or outside mirrors, of the center console, or of the windshield of a vehicle can be utilized as a projection screen or be equipped with a projection screen.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A projection system, comprising:
    a radiation source for producing electromagnetic radiation outside a visible wavelength region;
    an imaging unit irradiated by the radiation source;
    a projection screen having a radiation-sensitive surface capable of emitting fluorescent light in the visible wavelength region upon being excited by the electromagnetic radiation outside the visible wavelength region; and
    wherein the radiation-sensitive surface is formed of a material which, irrespective of a position, emits fluorescent light of different wavelengths according to a wavelength of the excitation radiation, and wherein the radiation source emits excitation radiation of different wavelengths.

2. The projection system according to claim 1, wherein the radiation source comprises a laser having a controllable output wavelength.

3. The projection system according to claim 2, wherein the radiation source is capable of emitting the electromagnetic radiation in at least one of an ultraviolet and infrared wavelength region.

4. The projection system according to claim 1, wherein the radiation source comprises several lasers of different output wavelengths.

5. The projection system according to claim 4, wherein the radiation source is capable of emitting the electromagnetic radiation in at least one of an ultraviolet and infrared wavelength region.

6. The projection system according to claim 1, wherein the radiation source is capable of emitting the electromagnetic radiation in at least one of an ultraviolet and infrared wavelength region.

7. The projection system according to claim 1, further comprising at least one additional projection screen, each additional projection screen being irradiated by way of a separate imaging unit and radiation source.

8. The projection system according to claim 1, wherein the radiation-sensitive surface is one of embedded in a flat glass carrier and applied to one of a flat, transparent and reflecting carrier.

9. The projection system according to claim 1, further comprising a vehicle on or in which the projection system is operatively configured.

10. The projection system according to claim 9, wherein the projection screen is arranged in a dashboard area of the motor vehicle.

11. The projection system according to claim 9, wherein the projection screen is arranged in one of a side window area and a windshield area of the motor vehicle.

12. The projection system according to claim 9, wherein the projection screen is arranged in a rearward side area of a front seat of the motor vehicle.

13. The projection system according to claim 12, wherein the front seat is a driver's seat.

14. The projection system according to claim 12, wherein the front seat is a front passenger seat.

15. The projection system according to claim 1, wherein the imaging unit comprises one of a microelectromechanical system, an LCOS microdisplay and a scanning system utilizing one of two galvanometric mirrors and MRSs.

16. The projection system according to claim 1, wherein, when viewed from a direction of a viewer, the radiation source and the imaging unit are arranged behind the projection screen.

17. The projection system according to claim 1, wherein, when viewed from a direction of a viewer, the radiation source and the imaging unit are arranged in front of the projection screen.

18. The projection system according to claim 1, wherein, on a side facing away from the imaging unit, the projection screen has a coating that is impenetrable by the excitation radiation used or a coating that absorbs the excitation radiation used.

19. A method for projecting information on a projection screen having a radiation-sensitive surface irradiated by a radiation source via an imaging unit, the method comprising the acts of:

utilizing electromagnetic radiation outside of a visible wavelength region to irradiate the projection screen, wherein the radiation-sensitive surface of the projection screen, irrespective of a position, emits fluorescent light of different wavelengths in a visible wavelength region according to a wavelength of the excitation radiation; and varying the wavelength of the excitation radiation outside the visible wavelength region to emit the fluorescent light of the different wavelengths.

* * * * *